United States Patent
Xu et al.

(10) Patent No.: US 12,033,532 B2
(45) Date of Patent: Jul. 9, 2024

(54) INTERACTIVE METHOD AND ELECTRONIC DEVICE

(71) Applicant: BEIJING LING TECHNOLOGY CO., LTD., Beijing (CN)

(72) Inventors: Le Xu, Beijing (CN); Pu Cheng, Beijing (CN); Xi Wang, Beijing (CN); Jiawei Gu, Beijing (CN)

(73) Assignee: BEIJING LING TECHNOLOGY CO., LTD., Beijing (CN)

( * ) Notice: Subject to any disclaimer, the term of this patent is extended or adjusted under 35 U.S.C. 154(b) by 980 days.

(21) Appl. No.: 17/267,749

(22) PCT Filed: Nov. 21, 2018

(86) PCT No.: PCT/CN2018/116585
§ 371 (c)(1),
(2) Date: Feb. 10, 2021

(87) PCT Pub. No.: WO2019/161685
PCT Pub. Date: Aug. 29, 2019

(65) Prior Publication Data
US 2021/0319714 A1    Oct. 14, 2021

(30) Foreign Application Priority Data

Feb. 26, 2018    (CN) .......................... 201810159703.7

(51) Int. Cl.
*G09B 5/06*     (2006.01)
*G06F 3/16*     (2006.01)
(Continued)

(52) U.S. Cl.
CPC ............... *G09B 5/062* (2013.01); *G06F 3/16* (2013.01); *G06F 16/638* (2019.01);
(Continued)

(58) Field of Classification Search
CPC ........... G09B 5/06; G09B 5/062; G09B 5/065
See application file for complete search history.

(56) References Cited

U.S. PATENT DOCUMENTS 4,884,974 A * 12/1989 DeSmet ................. G09B 5/062
434/335
5,417,575 A *  5/1995 McTaggart ............. G09B 5/065
434/308

(Continued)

FOREIGN PATENT DOCUMENTS

| CN | 106713896 A | 5/2017 |
| CN | 108460124 A | 8/2018 |

OTHER PUBLICATIONS

International Search Report of PCT/CN2018/116585 dated Feb. 21, 2019 (4 pages).

*Primary Examiner* — Kurt Fernstrom
(74) *Attorney, Agent, or Firm* — Calfee, Halter & Griswold LLP (57) ABSTRACT

A graphic recognition-based interactive method and electronic device. The interactive method comprises: acquiring a first image to be analyzed (101); recognizing the first image to be analyzed to obtain a recognition result (102); playing a narration audio file associated with the recognition result (103); playing a question audio file associated with the interactive content of the first image to be analyzed based on the recognition result after the narration audio file is played (104); acquiring a second image to be analyzed (105); determining whether a feature graphic exists in the second image to be analyzed (106); if the feature graphic exists in the second image to be analyzed, determining whether the feature graphic overlaps with an interactive region, wherein the interactive region is an area corresponding to an answer to the question in the question audio file (108); playing a correct audio file if the feature graphic and the interactive (Continued)

region are overlapped (109); and playing a wrong audio file if the feature graphic and the interactive region are not overlapped (110). The said method provides increased interactivity.

12 Claims, 4 Drawing Sheets

(51) Int. Cl.
| | |
|---|---|
| *G06F 16/638* | (2019.01) |
| *G06F 16/683* | (2019.01) |
| *G06F 18/214* | (2023.01) |
| *G06V 10/22* | (2022.01) |
| *G06V 30/19* | (2022.01) |
| *G06V 30/413* | (2022.01) |
| *G06V 40/10* | (2022.01) |
| *G09B 7/02* | (2006.01) |

(52) U.S. Cl.
CPC .......... *G06F 16/683* (2019.01); *G06F 18/214* (2023.01); *G06V 10/22* (2022.01); *G06V 30/19133* (2022.01); *G06V 30/413* (2022.01); *G06V 40/113* (2022.01); *G09B 7/02* (2013.01); *G06V 2201/131* (2022.01)

(56) References Cited

U.S. PATENT DOCUMENTS

| | | | | |
|---|---|---|---|---|
| 5,466,158 A | * | 11/1995 | Smith, III | G09B 7/04 434/362 |
| 5,636,995 A | * | 6/1997 | Sharpe, III | G09B 5/062 434/362 |
| 5,897,324 A | * | 4/1999 | Tan | G09B 5/062 462/66 |
| 6,668,156 B2 | * | 12/2003 | Lynch | G06F 3/0238 434/350 |
| 8,819,022 B1 | | 8/2014 | Holsman et al. | |
| 9,836,985 B2 | * | 12/2017 | Somasundaran | G09B 7/02 |
| 2003/0170604 A1 | * | 9/2003 | Mullen | B42D 1/007 434/317 |
| 2004/0104890 A1 | * | 6/2004 | Caldwell | G09B 5/06 345/156 |
| 2007/0093169 A1 | * | 4/2007 | Blaszczyk | A63H 33/38 446/147 |
| 2008/0140411 A1 | * | 6/2008 | Millman | G09B 5/062 704/270 |
| 2011/0106283 A1 | | 5/2011 | Robinson | |
| 2011/0201272 A1 | * | 8/2011 | De Weerd | G09B 19/025 455/39 |
| 2013/0316321 A1 | * | 11/2013 | Herz | H03K 17/9622 29/829 |
| 2015/0133023 A1 | * | 5/2015 | Lewis | A63H 33/26 446/91 |
| 2015/0242185 A1 | * | 8/2015 | Stone | G09B 5/06 345/174 |
| 2016/0148521 A1 | * | 5/2016 | Bujsaim | G06F 3/0418 345/174 |
| 2017/0345323 A1 | * | 11/2017 | Martinez Sanchez | G09B 5/14 |
| 2018/0260479 A1 | * | 9/2018 | Wang | G06V 10/764 |
| 2020/0037049 A1 | * | 1/2020 | Suzuki | H04N 21/8545 |

* cited by examiner

INTERACTIVE METHOD AND ELECTRONIC DEVICE

This application is a 371 of PCT Application No. PCT/CN2018/116585 filed Nov. 21, 2108, which claims benefits and priority of Chinese Patent Application No. 201810159703.7 filed on Feb. 26, 2018.

TECHNICAL FIELD

The present invention relates to the field of data processing technologies, and in particular, to an interactive method and electronic device.

BACKGROUND

A picture book is a type of book containing mainly pictures, with a small amount of text. Picture books can not only be used to tell stories, teach knowledge, but also to help children's mental education and development of intelligence.

In the prior art, the device usually plays the corresponding audio file automatically after recognizing the picture book. However, there is usually no interaction process after the playback is completed, and the user experience is not so good. In addition, the picture book users are usually children who are prone to distraction during the use of the picture book. Therefore, there is an urgent need to come up with a method for improving children's attention.

SUMMARY

In view of this, one of the objectives of the embodiments of the present invention is to provide a graphic recognition-based interactive method and electronic device to improve the interactive performance.

To this end, a first aspect of the embodiments of the present invention provides an interactive method, comprising:
  acquiring a first image to be analyzed;
  recognizing the first image to be analyzed to obtain a recognition result;
  playing a narration audio file associated with the recognition result;
  playing a question audio file associated with the interactive content of the first image to be analyzed based on the recognition result after the narration audio file is played;
  acquiring a second image to be analyzed;
  determining whether a feature graphic exists in the second image to be analyzed;
  if the feature graphic exists in the second image to be analyzed, determining whether the feature graphic overlaps with an interactive region, wherein the interactive region is an area corresponding to an answer to the question in the question audio file;
  playing a correct audio file if the feature graphic and the interactive region are overlapped; and
  playing a wrong audio file if the feature graphic and the interactive region are not overlapped.
  Optionally, the method further comprises:
acquiring feature graphic data, the amount of feature graphic data being greater than a preset threshold;
manually labeling the feature graphic data; and
using the labeled feature graphic data and training image data containing no feature graphic for training to obtain a feature detector;
determining whether a feature graphic exists in the second image to be analyzed comprises:
determining whether the feature graphic exists in the second image to be analyzed using the feature detector.
  Optionally, the feature graphic is a finger graphic, and the feature detector is a finger detector.
  Optionally, the finger detector is implemented by using one or more of Haar+adaboost, svm+hog, faster-rcnn, yolo, and ssd.
  Optionally, the method further comprises:
acquiring training image data; and
manually labeling interactive region for the training image data.
  Optionally, the method further comprises:
extracting comparison feature points in the training image data;
determining whether the feature graphic and the interactive region are overlapped comprises:
extracting feature points in the second image to be analyzed;
matching the feature points with the comparison feature points of the training image data corresponding to the second image to be analyzed to obtain a homography matrix;
projecting the feature graphic into the training image data corresponding to the second image to be analyzed using the homography matrix to determine a projection position of the feature graphic in the training image data; and
determining whether the projection position is overlapped with the manually labeled interactive region.
  Optionally, the interactive region includes a plurality of interactive regions and the question audio file associated with the interactive content of the first image to be analyzed includes a plurality of question audio files.
  The question audio files associated with the interactive content of the first image to be analyzed correspond to the interactive regions respectively, or one interactive region corresponds to a plurality of question audio files associated with the interactive content of the first image to be analyzed.
  Optionally, playing a question audio file associated with the interactive content of the first image to be analyzed based on the recognition result after the narration audio file is played comprises:
playing a first question audio file associated with a first interactive content of the first image to be analyzed based on the recognition result after the narration audio file is played; and
after playing the correct or wrong audio file, the method further comprises:
playing a second question audio file associated with a second interactive content of the first image to be analyzed.
  Optionally, after determining whether a feature graphic exists in the second image to be analyzed, the method further comprises:
playing a voice prompt if no feature graphic exists in the second image to be analyzed.
  A second aspect of the embodiments of the present invention provides an electronic device, comprising:
at least one processor; and
a memory communicatively coupled to the at least one processor;
wherein the memory stores instructions executable by the at least one processor, the instructions being executed by the at least one processor to enable the at least one processor to carry out the method describe above.
  The graphic recognition-based interactive method and electronic device provided by the embodiments of the present invention determine whether the user gives a right answer to the question by playing the question audio file and performing feature graphic detection on the acquired image to be analyzed, whereby the experience diversity and interactivity are enhanced.

DETAILED DESCRIPTION OF THE INVENTION

To better understand the objectives, technical solutions, and advantages of the present invention, the present invention is further described in detail below in combination with embodiments with reference to the accompanying drawings.

It should be noted that the use of terms "first" and "second" in the embodiments of the present invention is to distinguish two different entities or parameters with the same name. It is appreciated that the terms "first" and "second" are merely for convenience of description and are not to be construed as limitations on the embodiments of the invention.

Figure 1:
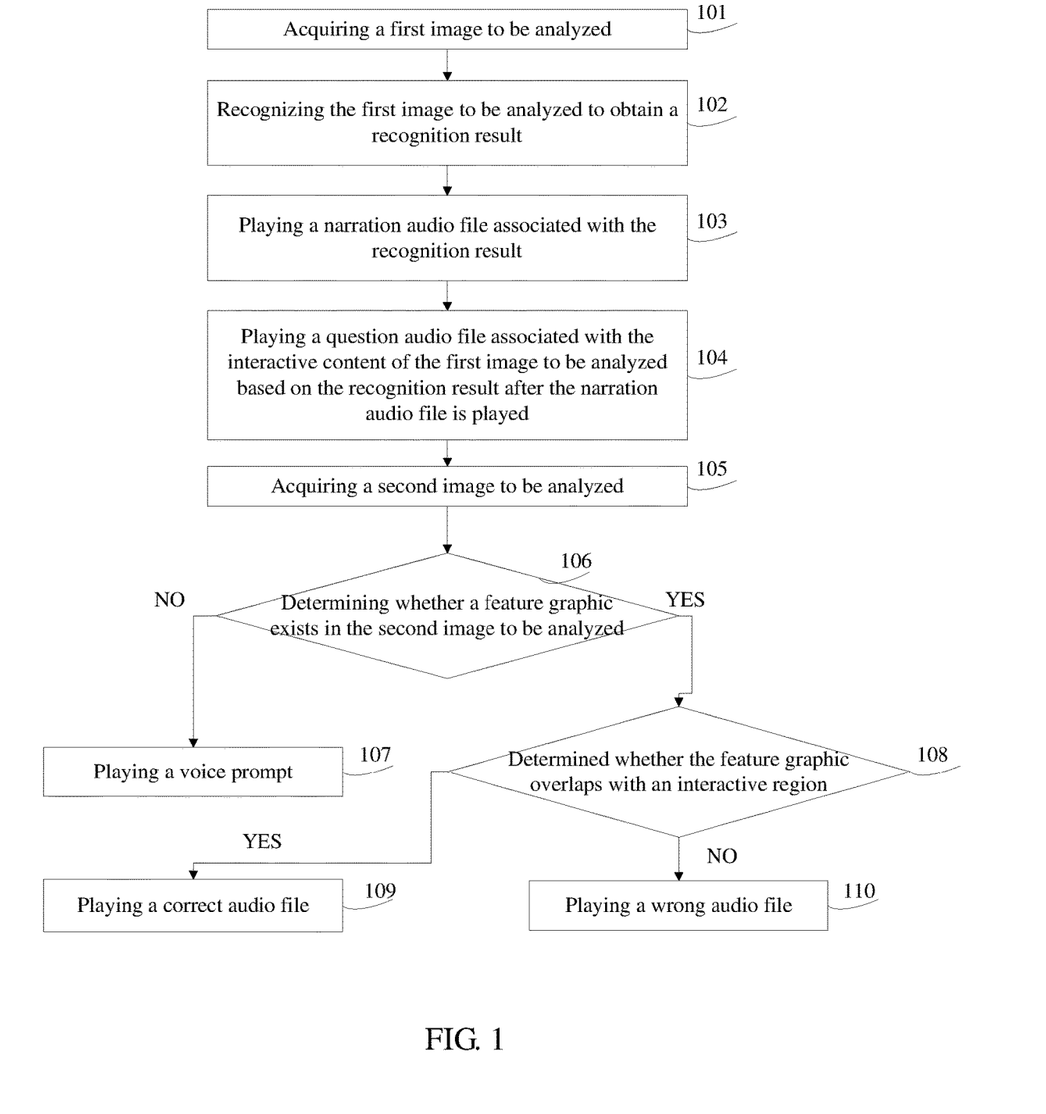
FIG. 1 is a schematic flowchart of an embodiment of the graphic recognition-based interactive method provided by the present invention.

According to a first aspect of the embodiments of the present invention, there is provided a graphic recognition-based interactive method which provides increased interactivity. FIG. 1 shows a schematic flowchart of an embodiment of the graphic recognition-based interactive method provided by the present invention.

The graphic recognition-based interactive method comprises the following steps.

At Step 101, a first image to be analyzed is acquired. The acquired first image may be acquired through a device having a photographing function such as a camera; the camera may be a camera on any electronic device (such as a mobile phone, a tablet computer, a camera, etc.), or it may be a camera installed in an acquisition device specially designed based on the present invention. In the case that the embodiment is applied to picture book recognition, the first image to be analyzed may be a photo obtained by photographing a picture book through the camera, a photo of cover of a picture book, or a photo of an inside page of the picture book which may vary depending on which page the user is currently reading.

At Step 102, the first image is recognized to obtain a recognition result.

At Step 103, a narration audio file associated with the recognition result is played. In the case that the embodiment is applied to picture book recognition, the recognition result may be a page of the picture book corresponding to the first image to be analyzed, which may be a cover or an inside page of the picture book, and the narration audio file associated with the recognition result may be an audio file narrating the content corresponding to the page of the picture book.

At Step 104, a question audio file associated with the interactive content of the first image to be analyzed is played based on the recognition result after the narration audio file is played. The interactive content may be content associated with the recognition result. In particular, when the embodiment is applied to picture book recognition, the interactive content refers to content corresponding to content contained in the page of the picture book and can be used for interaction. For example, an subject may be present on the page of the picture book and the question audio file may be an interactive question for this subject.

At Step 105, a second image to be analyzed is acquired. The second image to be analyzed may be acquired in the same manner as the first image to be analyzed.

At Step 106, it is determined whether a feature graphic exists in the second image to be analyzed. In the case that the embodiment is applied to picture book recognition, the second image to be analyzed may be obtained by performing image acquisition on the page of the picture book corresponding to the first image to be analyzed. Of course, the second image to be analyzed may be obtained in other ways. The content of the page of the picture book corresponding to the second image to be analyzed may be recognized by an additional recognition steps. When the page of the picture book corresponding to the second image to be analyzed is the same as the page of the picture book corresponding to the first image to be analyzed, the feature graphic may exist in the second image to be analyzed compared to the first image to be analyzed.

At Step 107, a voice prompt is played if no feature graphic exists in the second image to be analyzed. Here, the existence of the feature graphic refers to that the user performs a corresponding interactive operation in response to the question audio file, for example, the user puts a finger to a certain region on the page of the picture book corresponding to the answer to the question; when no feature graphic is present, it means that the user does not answer the question, and in this case a voice prompt is played to remind the user to answer the question.

At Step 108, it is determined whether the feature graphic overlaps with an interactive region if the feature graphic exists in the second image to be analyzed, wherein the interactive region is an area corresponding to an answer to the question in the question audio file.

At Step 109, a correct audio file is played if the feature graphic and the interactive region are overlapped. The correct audio file refers to the audio played when the answer is correct, such as "Bingo". Of course, the content in the correct audio file may also correspond to the question of the question audio file. For example, the content of the question audio file may be "Where is Pooh?" and the content of the correct audio file may be "Right, Pooh is in the car."

At Step 110, a wrong audio file is played if the feature graphic and the interactive region are not overlapped. The correct audio file refers to the audio played when the answer is wrong, such as "Wrong answer". Of course, the content of the wrong audio file may also correspond to the question in the question audio file. For example, the content of the question audio file may be "Where is Pooh?" and the content of the wrong audio file may be "That's not Pooh. He is in the car."

It should be noted that the above method can be applied to an interactive process of picture book recognition. Of course, it should not be ruled out that the method can also be applied to other similar interactive scenes. Therefore, the protection scope should not be limited to the single scene of picture book recognition.

According to the embodiments describe above, the graphic recognition-based interactive method provided by the embodiments of the present invention determines whether the user gives a right answer to the question by playing the question audio file and performing feature graphic detection on the acquired image to be analyzed, whereby the experience diversity and interactivity are enhanced.

Figure 2:
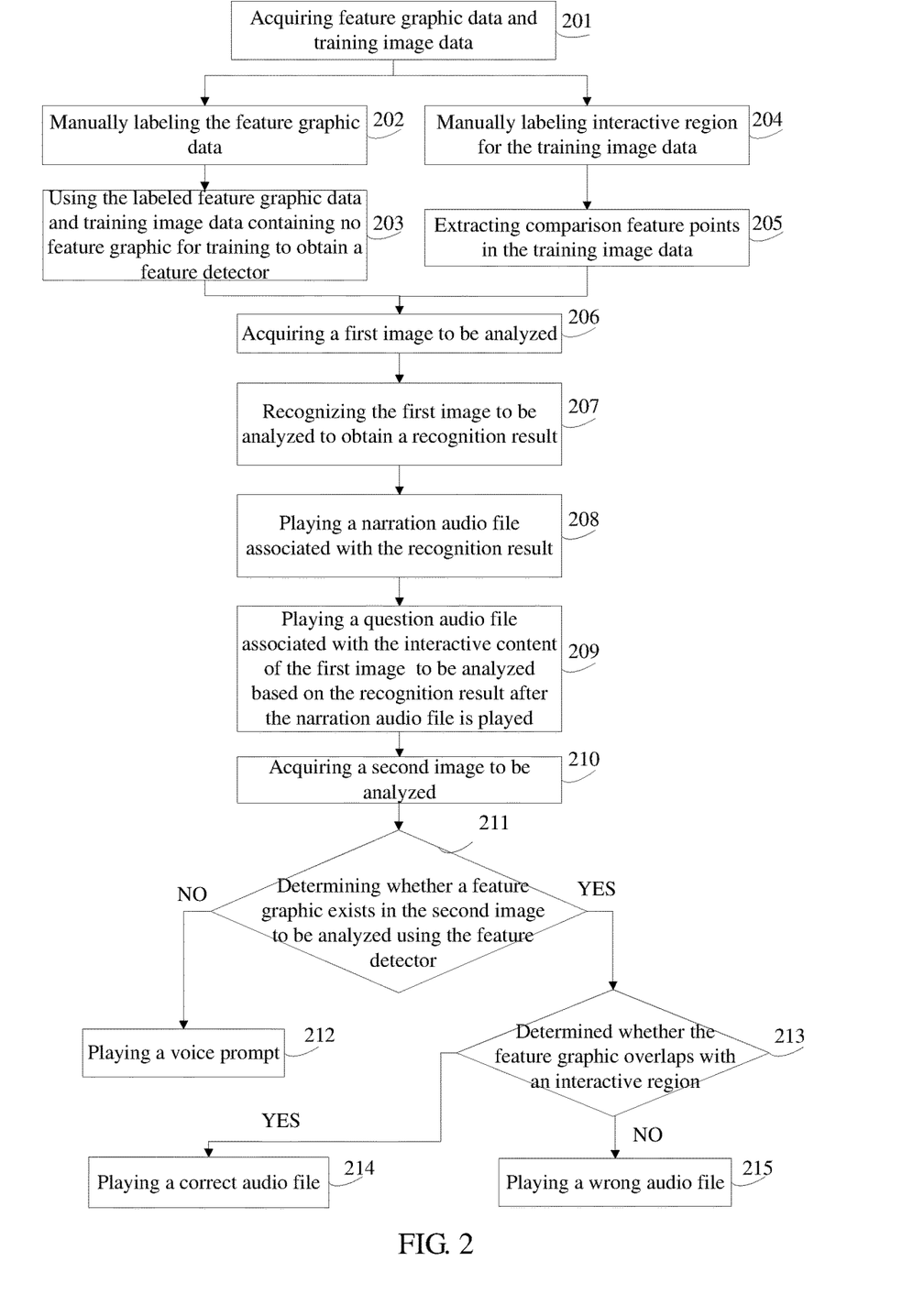
FIG. 2 is a schematic flowchart of another embodiment of the graphic recognition-based interactive method provided by the present invention.

The embodiments of the present invention further provide another embodiment of the graphic recognition-based interactive method which provides increased interactivity. FIG. 2 shows a schematic flowchart of another embodiment of the graphic recognition-based interactive method provided by the present invention.

The graphic recognition-based interactive method comprises the following steps.

At Step 201, the feature graphic data is acquired. The amount of feature graphic data is greater than a preset threshold. The value of the preset threshold can be set according to the need, as long as the feature graphic can be recognized with high accuracy. The amount of the feature graphic data is determined according to the number of objects that need to be recognized or read. In particular, when the embodiment is applied to picture book recognition, the amount of feature graphic data may be the total number of recognizable picture book covers and the inside pages.

At Step 202, the feature graphic data is manually labeled. The feature graphic may be in various forms and can be manually labeled by acquiring a large number of feature graphic data, so that the feature graphic can also be recognized even when the form of the feature graphic changes.

At Step 203, training is carried out using the labeled feature graphic data and training image data containing no feature graphic to obtain a feature detector. Optionally, the feature graphic is a finger graphic, the feature detector is a finger detector, and the feature graphic data comprises finger graphics of various forms. The labeled feature graphic data is the labeled finger graphic data, and the training image data containing no feature graphic is training image data containing no finger graphic. The training image data refers to image data used for training, which is image data for comparison that is actually stored in a database when the image to be analyzed is recognized. For example, when the present embodiment is applied to the picture book recognition, the training image data here may be the image data of pages in respective picture books, including the covers and inside pages of the picture books. The training image data also needs to include corresponding interactive content. For example, when the content of the question audio file is "Where is Pooh?", the corresponding training image data needs to include an image of Winnie the Pooh (see FIG. 4) and the corresponding region is the interactive region. Optionally, the finger detector is implemented by using one or more of Haar+adaboost, svm+hog, faster-rcnn, yolo, and ssd.

Figure 4:
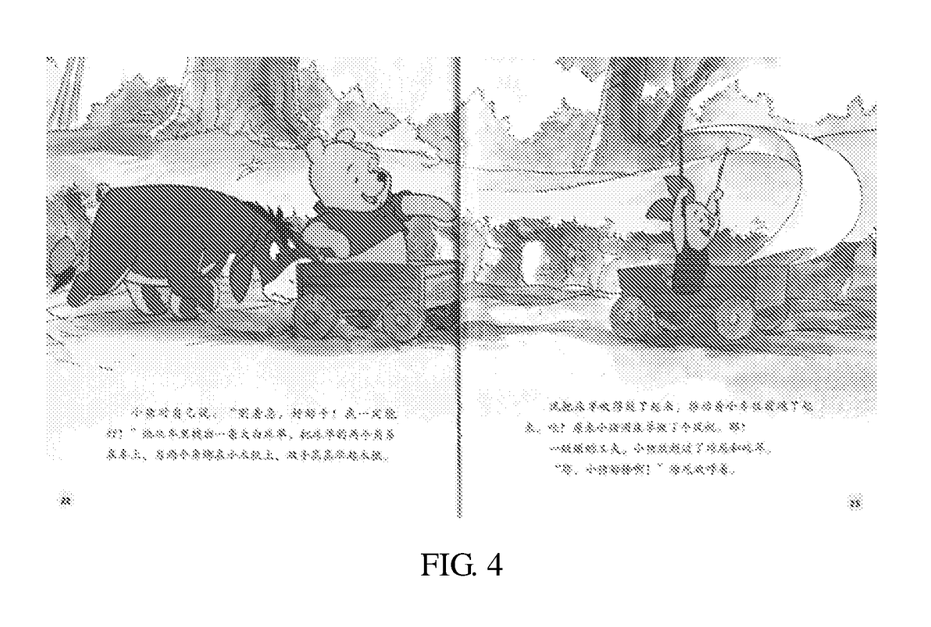
FIG. 4 is a schematic diagram of an example of the first image to be analyzed in an embodiment of the graphic recognition-based interactive method provided by the present invention.

At Step 204, an interactive region is manually labelled for the training image data. The interactive region corresponds to a feature. Referring to FIG. 4, it can be seen that the feature in the figure includes at least Pooh, Piglet, Eeyore, Car 1, Car 2, and each of these features can correspond to an interactive region. For example, for the feature Pooh, the content of the question audio file may be "Where is Pooh?", "What is Pooh standing above?" or "What is the Eeyore pushing?"

At Step 205, comparison feature points in the training image data are extracted. The comparison feature points are used for subsequent image matching, such that the feature graphic is projected into the corresponding training image data.

At Step 206, a first image to be analyzed is acquired. The acquired first image to be analyzed may be acquired through a device having a photographing function such as a camera; the camera may be a camera on any electronic device (such as a mobile phone, a tablet computer, a camera, etc.), or it may be a camera installed in an acquisition device specially designed based on the present invention. In the case that the embodiment is applied to picture book recognition, the first image to be analyzed may be a photo obtained by photographing a picture book through the camera, a photo of cover of a picture book, or a photo of an inside page of the picture book which may vary depending on which page the user is currently reading.

At Step 207, the first image to be analyzed is recognized to obtain a recognition result.

At Step 208, a narration audio file associated with the recognition result is played. In the case that the embodiment is applied to picture book recognition, the recognition result may be a page of the picture book corresponding to the first image to be analyzed, which may be a cover or an inside page of the picture book, and the narration audio file associated with the recognition result may be an audio file narrating the content corresponding to the page of the picture book.

At S209, a question audio file associated with the interactive content of the first image to be analyzed is played based on the recognition result after the narration audio file is played. The interactive content may be content associated with the recognition result. In particular, when the embodiment is applied to picture book recognition, the interactive content refers to content corresponding to content contained in the page of the picture book and can be used for interaction. For example, a subject may be present on the page of the picture book and the question audio file may be an interactive question for this subject. The question audio file may be a preset audio, or it may be supported by tts (text to speech).

The question audio file may be a question for any feature, such as:
a) a question on the location of the feature, such as "Where's Pooh? Please point it out with your fingers."
b) a logic question on the feature, such as "What is Pooh standing above'?"
c) a scene question, such as "What is Eeyore pushing?"

At Step 210, a second image to be analyzed is acquired. The second image to be analyzed may be acquired in the same manner as the first image to be analyzed.

At Step 211, it is determined whether the feature graphic exists in the second image to be analyzed using the feature detector. Optionally, the feature graphic is a finger graphic, and the feature detector is a finger detector by which the area of the finger graphic present in the second image to be analyzed can be directly detected.

At Step 212, a voice prompt is played if no feature graphic exists in the second image to be analyzed. Here, the existence of the feature graphic refers to that the user performs a corresponding interactive operation in response to the question audio file, for example, the user puts a finger to a certain region on the page of the picture book corresponding to the answer to the question; when no feature graphic, it means that the user does not answer the question, and in this case a voice prompt is played to remind the user to answer the question.

Optionally, the method quits the question mode if the feature graphic is still not detected after a preset period of waiting time has elapsed after the voice prompt is played.

At Step 213, it is determined whether the feature graphic overlaps with an interactive region if the feature graphic exists in the second image to be analyzed, wherein the interactive region is an area corresponding to an answer to the question in the question audio file.

Figure 3:
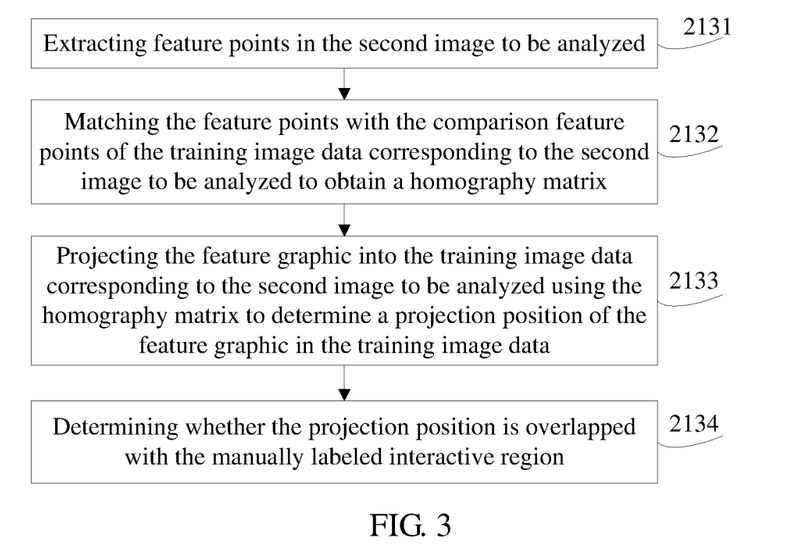
FIG. 3 is a schematic flowchart of Step 214 in the another embodiment of the graphic recognition-based interactive method provided by the present invention.

Specifically, Step 213 further comprises the following steps:

Step 2131, at which feature points in the second image to be analyzed are extracted.

Step 2132, at which the feature points are matched with the comparison feature points of the training image data corresponding to the second image to be analyzed to obtain a homography matrix.

Step 2133, at which the feature graphic is projected into the training image data corresponding to the second image to be analyzed using the homography matrix to determine a projection position of the feature graphic in the training image data.

Step 2134, at which it is determined whether the projection position is overlapped with the manually labeled interactive region.

At Step 214, a correct audio file is played if the projection position is overlapped with the manually labeled interactive region (i.e., the feature graphic and the interactive region are overlapped). The correct audio file refers to the audio played when the answer is correct, such as "Bingo". Of course, the content in the correct audio file may also correspond to the question of the question audio file. For example, the content of the question audio file may be "Where is Pooh?" and the content of the correct audio file may be "Right, Pooh is in the car."

At Step 215, a wrong audio file is played if the projection position isn't overlapped with the manually labeled interactive region (i.e., the feature graphic and the interactive region aren't overlapped). The wrong audio file refers to the audio played when the answer is wrong, such as "Wrong answer". Of course, the content of the wrong audio file may also correspond to the question in the question audio file. For example, the content of the question audio file may be "Where is Pooh?" and the content of the wrong audio file may be "That's not Pooh. He is in the car."

It should be noted that the above method can be applied to an interactive process of picture book recognition. Of course, it should not be ruled out that the method can also be applied to other similar interactive scenes. Therefore, the protection scope should not be limited to the single scene of picture book recognition.

According to the embodiments describe above, the graphic recognition-based interactive method provided by the embodiments of the present invention determines whether the user gives a right answer to the question by playing the question audio file and performing feature graphic detection on the acquired image to be analyzed, whereby the experience diversity and interactivity are enhanced. In particular, when the present embodiment is applied to picture book reading, a variety of interactive solutions can effectively increase children's concentration, and have a more profound effect on young children's English education.

Optionally, the interactive region includes a plurality of interactive regions and the question audio file associated with the interactive content of the first image to be analyzed includes a plurality of question audio files. Referring to FIG. 4, it can be seen that the feature in the figure includes at least Pooh, Piglet, Eeyore, Car 1, and Car 2, and correspondingly there may be a plurality of interactive regions.

The question audio files associated with the interactive content of the first image to be analyzed correspond to the interactive regions respectively, or one interactive region corresponds to a plurality of question audio files associated with the interactive content of the first image to be analyzed.

Optionally, playing a question audio file associated with the interactive content of the first image to be analyzed based on the recognition result after the narration audio file is played comprises:

playing a first question audio file associated with a first interactive content of the first image to be analyzed based on the recognition result after the narration audio file is played; and after playing the correct or wrong audio file, the method further comprises:

playing a second question audio file associated with a second interactive content of the first image to be analyzed.

According to the above embodiments, the graphic recognition-based interactive method may involve multiple features on the same page of the picture book, thereby further improving interactivity and fun.

Figure 5:
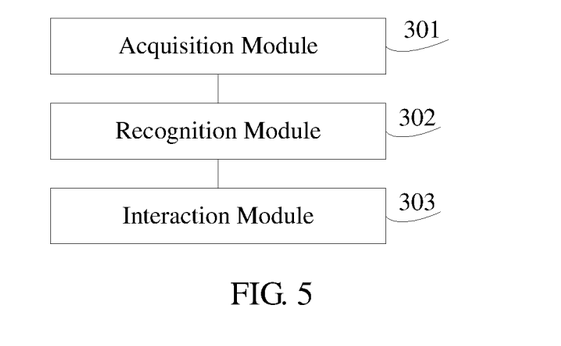
FIG. 5 is a schematic structural diagram of an embodiment of the graphic recognition-based interactive device provided by the present invention.

A second aspect of the embodiments of the present invention provides a graphic recognition-based interactive device. FIG. 5 is a schematic structural diagram of an embodiment of the graphic recognition-based interactive device provided by the present invention.

The graphic recognition-based interactive device comprises:

an acquisition module 301 configured to acquire a first image to be analyzed and a second image to be analyzed;

a recognition module 302 configured to recognize the first image to be analyzed to obtain a recognition result;

an interaction module 303 configured to: play a narration audio file associated with the recognition result; play a question audio file associated with the interactive content of the first image to be analyzed based on the recognition result after the narration audio file is played; determine whether a feature graphic exists in the second image to be analyzed; if the feature graphic exists in the second image to be analyzed, determine whether the feature graphic overlaps with an interactive region, wherein the interactive region is an area corresponding to an answer to the question in the question audio file; play a correct audio file if the feature graphic and the interactive region are overlapped; and play a wrong audio file if the feature graphic and the interactive region are not overlapped.

According to the embodiments describe above, the graphic recognition-based interactive device provided by the embodiments of the present invention determines whether the user gives a right answer to the question by playing the question audio file and performing feature graphic detection on the acquired image to be analyzed, whereby the experience diversity and interactivity are enhanced.

Figure 6:
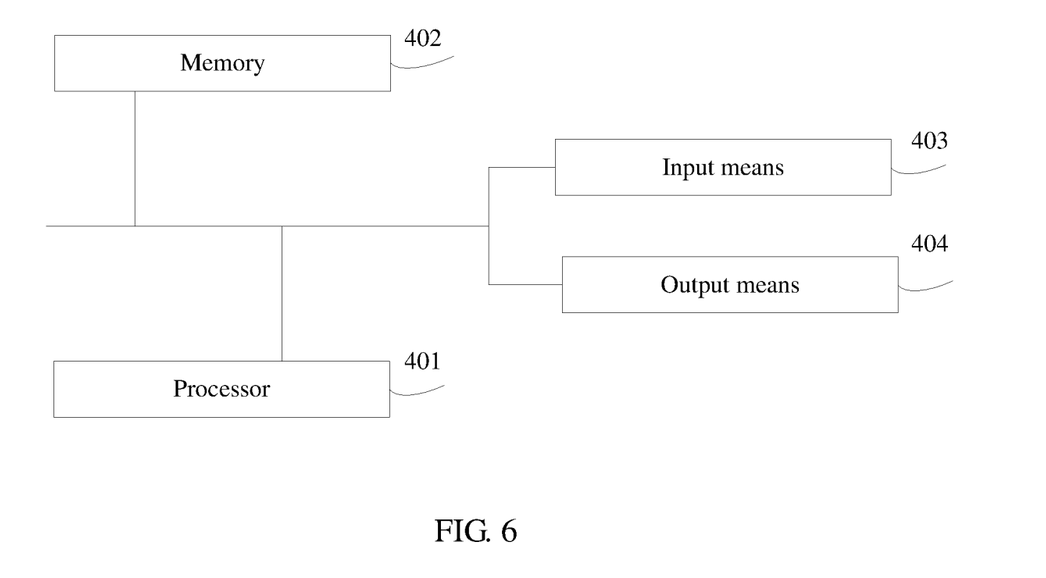
FIG. 6 is a schematic diagram of a hardware structure of an embodiment of the device for performing the graphic recognition-based interactive method provided by the present invention.

A third aspect of the embodiments of the present invention provides a device for performing the graphic recognition-based interactive method. FIG. 6 is a schematic diagram of a hardware structure of an embodiment of the device for performing the graphic recognition-based interactive method provided by the present invention.

As shown in FIG. 6, the device comprises:
one or more processors 401 and a memory 402. As an example, one processor 401 is shown in FIG. 6.

The device for performing the graphic recognition-based interactive method may further comprise input means 403 and output means 404.

The processor 401, memory 402, input means 403, and output means 404 may be connected by a bus or other means. In FIG. 6, the bus connection is taken as an example.

The memory 402 is a non-transitory computer-readable storage medium that may be used to store non-volatile software programs, non-volatile computer executable programs and modules, such as program instructions/modules corresponding to the graphic recognition-based interactive method provided in the embodiments of the present invention, for example, the acquiring module 301, the recognition module 302, and the interaction module 303 as shown in FIG. 5.) The processor 401 executes various functional applications and data processing of the server (namely, the graphic recognition-based interactive method provided in the embodiments of the present invention) by running the non-volatile software program, instructions, and modules stored in the first memory 402.

The memory 402 may include a program storage area and a data storage area, wherein the program storage area may store an operating system, and an application program required by at least one function, and the data storage area may store data created based on the use of the graphic recognition-based interactive device, and the like. In addition, the memory 402 may include a high-speed random access memory and may further include a non-volatile memory such as at least one magnetic disk storage device, flash memory device, or other non-volatile solid-state storage device. In some embodiments, the memory 402 optionally includes memories remotely located relative to the processor 401, and these remote memories may be connected to a user behavior monitoring device through the network. Examples of the network include, but are not limited to, the Internet, an intranet, a local area network, a mobile communication network, and combinations thereof.

The input means 403 may receive input digits or characters and generate a key signal input related to user setting and function control of the graphic recognition-based interactive device. The output means 404 may include a display device such as a display screen.

The one or more modules are stored in the memory 402 and, when executed by the one or more processors 401, perform the graphic recognition-based interactive method according to any of the above method embodiments. An embodiment of the device for executing the graphic recognition-based interactive method can produce the same or similar technical effects as the foregoing method embodiments.

Embodiments of this application provide a non-transitory computer storage medium in which computer executable instructions are stored, and the computer executable instructions can perform a method for processing a list item operation in any of above-described method embodiments. The embodiment of the non-transitory computer storage medium has the same or similar technical effects as any of the foregoing method embodiments.

Finally, it should be noted that those of ordinary skill in the art may understand that all or part of the processes in the foregoing method embodiments may be implemented by related hardware instructed by a computer program which is stored in a computer readable storage medium and, when executed, may include the processes of the foregoing method embodiments. The storage medium may be a magnetic disk, an optical disk, a Read-Only Memory (ROM) or a Random Access Memory (RAM), etc. The embodiment of the computer program has the same or similar technical effects as any of the foregoing method embodiments.

In addition, typically, the devices, apparatuses, and the like described in the present disclosure may be various electronic terminal devices such as mobile phones, personal digital assistants (PDAs), tablet computers (PADs), smart TVs, etc., or may be large-scale terminal devices, such as servers, etc. Therefore, the scope of protection of the present disclosure should not be limited to a specific type of device or apparatus. The client described in the present disclosure may be applied to any one of the aforementioned electronic terminal devices in the form of electronic hardware, computer software, or a combination thereof.

In addition, the method according to the present disclosure may also be implemented as a computer program executed by a CPU, which may be stored in a computer-readable storage medium. When the computer program is executed by the CPU, the above-described functions defined in the method of the present disclosure are performed.

The above method steps and system units may also be implemented using a controller and a computer-readable storage medium for storing a computer program that causes the controller to implement the above steps or unit functions.

In addition, it should be clear that the described computer-readable storage medium (e.g., memory) may be volatile memory or non-volatile memory, or may include volatile memory and nonvolatile memory. As a non-limiting example, nonvolatile memory can include read-only memory (ROM), programmable ROM (PROM), erasable programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage medium include but not limited to these and other suitable types of memory.

Those skilled in the art will understand that the disclosed various exemplary logic blocks, modules, circuits and algorithm steps can be implemented in electronic hardware, computer software or a combination thereof. In order to clearly illustrate the interchangeability between the hardware and the software, the functions of the various exemplary components, blocks, modules, circuits and algorithm steps have been generally described. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be designed using the following components performing the disclosed functionalities: general-purpose processor, digital signal processor (DSP), application specific integrated circuits (ASICs), field programmable gate array (FPGA) or other programmable logic device, discrete gate or transistor logic, discrete hardware components, or any combination of these components. The general-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or any combination thereof. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

In one or more exemplary designs, the above described functionalities can be implemented in hardware, software, firmware, or any combination thereof. If implemented in software, the functionalities can be treated as one or more instructions or codes and stored in or transmitted over a computer-readable media. Computer-readable media include both computer storage media and communication media including any media which facilitates the transfer of a computer program from one location to another location. A storage medium can be any available medium that can be accessed by a general purpose or a special purpose computer. For example and without limitation, such computer-readable media can include RAM, ROM, EEPROM, CD-ROM or other optical storage devices, magnetic disk storage or other magnetic storage devices, or any other media used to carry or store desired program codes in the form of instructions or data structures that can be accessed by the general or special purpose computers and general or special purpose processors. In addition, any connection can be properly termed as a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Magnetic and optical disks, as used herein, include compact disk (CD), laser disc, optical disc, digital versatile disc (DVD), floppy disk, blue-ray disc, wherein disks usually reproduce data magnetically and optical discs reproduce data optically with laser. Combinations of the above should also be included within the scope of computer-readable media.

Although the above disclosure illustrates exemplary embodiments of the present invention, it should be noted, however, various changes and modifications may be made without departing from the scope of the present invention defined in the claims. According to the methods illustrated in the embodiments of the present invention, the functions, steps and/or actions in the claim are not required to be executed in a particular order. In addition, although the elements of the present invention may be described or requested individually, they may also be assumed to be plural, unless they are clearly limited to a single number.

It is understood that, as used herein, unless the context clearly support exceptions, the singular forms "a", "an", "the" are intended to include the plural forms. It should also be appreciated that the use herein, "and/or" includes any and all possible combinations of one or more of the associated listed items.

Serial numbers of the embodiments of the present invention are merely for description, and do not represent the advantages and disadvantages of the embodiments.

Those skilled in the art would appreciate that all or a part of the steps in the foregoing embodiments may be implemented by hardware or a program instructing relevant hardware. The program may be stored in a computer readable storage medium, such as a ROM, a magnetic disk, or an optical disk etc.

Those ordinary skilled in the art should understand: the discussion on any of the above embodiments is merely exemplary, without intention to imply that the scope of the present disclosure (including the claims) is limited to those embodiments; consistent with the thought of the present disclosure, combinations of the technical features in one or more of the above embodiments are feasible, and many other changes in different aspects of the present disclosure exist; for conciseness, these combinations and changes are not presented in details. Thus, any omission, modification, equivalent replacement, improvement and so on made within the spirit and principle of the embodiments of the present disclosure shall be encompassed by the protection scope of the present disclosure.

The invention claimed is:

1. A computer-implemented method, comprising: acquiring,
at an acquisition module, a first image of a page from a photographic device, wherein the photographic device is in network communication with the acquisition module, the first image to be analyzed;
recognizing the first image to be analyzed to obtain a recognition result;
playing a narration audio file associated with the recognition result;
playing a question audio file associated with the interactive content of the first image to be analyzed based on the recognition result after the narration audio file is played;
acquiring, at the acquisition module, a second image of the page from the photographic device, the second image to be analyzed;
determining whether a feature graphic exists in the second image to be analyzed;
if the feature graphic exists in the second image to be analyzed, determining whether the feature graphic overlaps with an interactive region, wherein the interactive region is an area corresponding to an answer to the question in the question audio file, the steps comprising:
extracting feature points in the second image to be analyzed;
matching the feature points corresponding to the second image with comparison feature points of training image data to obtain a homography matrix, the training image data comprising images taken with no feature graphic present;
projecting the feature graphic into the training image data corresponding to the second image to be analyzed using the homography matrix to determine a projection position of the feature graphic in the training image data; and determining whether the projection position is overlapped with a manually labeled interactive region on the training image data;

playing a correct audio file if the feature graphic and the interactive region are overlapped; and playing a wrong audio file if the feature graphic and the interactive region are not overlapped.

2. An electronic device, comprising: at least one processor; and a memory communicatively coupled to the at least one processor; wherein the memory stores instructions executable by the at least one processor, the instructions being executed by the at least one processor to enable the at least one processor to carry out the method according to claim 1.

3. The method according to claim 1, further comprising: acquiring feature graphic data, the amount of the feature graphic data being greater than a preset threshold;

manually labeling the feature graphic data; and using the labeled feature graphic data and training image data containing no feature graphic for training to obtain a feature detector; determining whether a feature graphic exists in the second image to be analyzed comprises: determining whether the feature graphic exists in the second image to be analyzed using the feature detector.

4. An electronic device, comprising: at least one processor; and a memory communicatively coupled to the at least one processor; wherein the memory stores instructions executable by the at least one processor, the instructions being executed by the at least one processor to enable the at least one processor to carry out the method according to claim 3.

5. The method according to claim 3, wherein the feature graphic is a finger graphic, and the feature detector is a finger detector.

6. An electronic device, comprising: at least one processor; and a memory communicatively coupled to the at least one processor; wherein the memory stores instructions executable by the at least one processor, the instructions being executed by the at least one processor to enable the at least one processor to carry out the method according to claim 5.

7. The method according to claim 1, wherein the interactive region includes a plurality of interactive regions and the question audio file associated with the interactive content of the first image to be analyzed includes a plurality of question audio files; the question audio files associated with the interactive content of the first image to be analyzed correspond to the interactive regions respectively, or one interactive region corresponds to a plurality of question audio files associated with the interactive content of the first image to be analyzed.

8. An electronic device, comprising: at least one processor; and a memory communicatively coupled to the at least one processor; wherein the memory stores instructions executable by the at least one processor, the instructions being executed by the at least one processor to enable the at least one processor to carry out the method according to claim 7.

9. The method according to claim 7, wherein playing a question audio file associated with the interactive content of the first image to be analyzed based on the recognition result after the narration audio file is played comprises: playing a first question audio file associated with a first interactive content of the first image to be analyzed based on the recognition result after the narration audio file is played; and after playing the correct or wrong audio file, the method further comprises: playing a second question audio file associated with a second interactive content of the first image to be analyzed.

10. An electronic device, comprising: at least one processor; and a memory communicatively coupled to the at least one processor; wherein the memory stores instructions executable by the at least one processor, the instructions being executed by the at least one processor to enable the at least one processor to carry out the method according to claim 9.

11. The method according to claim 1, wherein after determining whether a feature graphic exists in the second image to be analyzed, the method further comprises: playing a voice prompt if no feature graphic exists in the second image to be analyzed.

12. An electronic device, comprising: at least one processor; and a memory communicatively coupled to the at least one processor; wherein the memory stores instructions executable by the at least one processor, the instructions being executed by the at least one processor to enable the at least one processor to carry out the method according to claim 11.

* * * * *